Patented July 11, 1944

2,353,411

UNITED STATES PATENT OFFICE 2,353,411

TEXTILE PRINTING COMPOSITION

Charles Franklin Miller, Wilmington, Del., assignor to E. I. du Pont de Nemours & Company, Wilmington, Del., a corporation of Delaware No Drawing. Application September 2, 1942, Serial No. 457,083

6 Claims. (Cl. 8—72)

This invention relates to an improved process for printing metallizable azo dyestuffs on textile fabric, and to an improved printing composition for this purpose. This invention is particularly concerned with metallizable azo dyestuffs of the class generally designated as mordant-acid dyes. See, for instance, 1941 Yearbook of American Association of Textile Chemists and Colorists, (vol. 18), pp. 370 and 376–498.

It is an object of this invention to provide an improved composition for printing textile fabric with dyestuffs of the above class, whereby better solubility of the dyestuff in the printing paste may be achieved, causing in turn better penetration of the dyestuff into the fabric, increased speed of fixation, increased brilliance and tinctorial strength, and other advantages as will be more apparent from the discussion following.

This and other objects of my invention are achieved by modifying the printing composition so that it contains an ethanolamine, for instance mono-, di- or triethanolamine, in sufficient quantity to give the printing paste an alkalinity corresponding to a pH value between 8.0 and 10.5.

In conventional practice, mordant-acid azo dyes have been printed from an acidic medium in the optional presence of free organic acids. This is illustrated, for example, in U. S. P. 2,131,320, which uses a mixture of chromium lactate, urea and sodium glycollate having a pH of 5.0; U. S. P. 1,848,589 uses a mixture of chromium acetate and urea, having a pH of 3.5; and U. S. P. 1,942,774 uses a mixture of chromium acetate, urea and ammonium thiocyanate having a pH of 4.0. Conventional formulations of this type are further described in Knecht and Fothergill—"Principles and Practice of Textile Printing"—third edition—1936—pages 289–298, as well as in the trade literature of various manufacturers of chrome mordant dyestuffs.

I have now discovered that metallizable azo dyes of the mordant-acid group, as hereinabove described, can be printed to advantage from a printing paste containing an ethanolamine, preferably triethanolamine, in sufficient quantity to give the paste an alkaline reaction corresponding to a pH value between 8.0 and 10.5. Generally, this implies the use of a quantity of the ethanolamine equal to from 5 to 15% by weight of the entire paste. In addition to the ethanolamine, the paste must contain, of course, a thickening agent, water, and a water-soluble compound of the metal selected for metallization of the azo dye. According to my findings, best results are obtained by choosing a metal of an atomic weight not less than 52 and not greater than 64.

In other words, this invention contemplates the use of water-soluble compounds of metals selected from the group consisting of chromium, manganese, iron, cobalt, nickel and copper. As typical illustrations of usable compounds may be mentioned sodium chromate, sodium bichromate, ammonium bichromate, chromium fluoride, chromium acetate, chromium chloride, cobalt acetate, cobalt bromide, cobalt chloride, nickel chloride, nickel acetate, copper acetate, copper nitrate, copper sulfate and copper chloride.

As thickening agents, any of the agents customary in the art may be used, for instance starch, dextrine, tragacanth, karaya, alginates, etc.

The advantages over conventional practice that may be obtained by the use of my novel printing composition are:

1. Better solution of the dyestuff. Many dyestuffs of the above defined class are difficult to dissolve in prior art formulations at the concentrations used for printing.

2. Improved penetration of the dyestuff into the cloth.

3. Increased speed of fixation, which reduces the time necessary for aging or fixing the dyestuff.

4. Increased strength and brilliance of the prints.

5. Nitrogenous fibers such as nylon and silk, and to a lesser extent, wool, which have a tendency to tender on exposure to light are made much less susceptible to tendering particularly when the metallizing element is copper, nickel, or a mixture of the two.

I am aware that it has been recommended to dye vegetable fiber with complex metal salts of direct dystuffs from a caustic alkaline bath containing anion-active or cation-active auxiliary agents such as pyridine, alkylamines, aryl-sulfonic acids, alcohol sulfates, and ethylene-oxide polymers. However, the conditions there indicated were highly alkaline (pH over 12.00), and are not suitable for printing purposes. Such highly alkaline conditions cause coagulation of the printing paste and are generally unsatisfactory when applied to printing.

The following examples illustrate but in no wise limit the extent of this invention. All parts are by weight.

Example 1

| | Parts |
|---|---|
| Pontachrome Fast Red E Conc.—Color Index #652 | 3.0 |
| Triethanolamine | 15.0 |
| Water | 15.5 |
| Copper chloride | 1.5 |
| Thickener | 65.0 |
| Total | 100.0 |

The above described printing paste is printed on nylon, silk or wool piece goods, dried, aged 45 minutes in a "cottage steamer," soaped, rinsed and dried. A deep blue red design is obtained in the imprinted area. This design is of exceptionally good light- and wash-fastness and the imprinted areas are much less susceptible to tendering in the light than when the dyestuff is applied in the conventional acid medium.

The substitution of nickel chloride for copper chloride in the above formulation gives a yellower shade of red of similar fastness and anti-tendering characteristics. If a mixture of copper chloride and nickel chloride is used, an intermediate shade of light-fastness, superior to that obtained with the single constituent, is produced.

*Example II*

| | Parts |
|---|---|
| Pontachrome Flavine A—Color Index #219 | 3.0 |
| Monoethanolamine | 10.0 |
| Sodium chromate | 2.5 |
| Water | 19.5 |
| Thickening | 65.0 |
| Total | 100.0 |

The above described printing paste is printed on cotton or rayon piece goods, dried, aged 10 minutes in a vat color ager, soaped, rinsed and dried. A bright yellow design is obtained in the imprinted area. This design is extremely fast to light and is stronger, brighter and shows better penetration than when the dyestuff is applied in the conventional acid medium.

*Example III*

| | Parts |
|---|---|
| Pontachrome Blue Black R. Conc.—Color Index #202 | 2.0 |
| Triethanolamine | 10.0 |
| Nickel chloride | 2.5 |
| Water | 20.5 |
| Thickening | 65.0 |
| Total | 100.0 |

The above described printing paste is printed on nylon, wool or silk, dried, aged 30 minutes in a "cottage steamer," soaped, rinsed and dried. A bright red-violet design is obtained in the imprinted area. This design is fast to light and soaping and the imprinted areas are much less susceptible to tendering in the light than when the dyestuff is applied in the conventional acid medium.

The substitution of copper chloride for nickel chloride in the above formulation gives a much bluer shade of violet of similar fastness and anti-tendering characteristics.

The substitution of sodium chromate for nickel chloride in the above formulation gives a pleasing grey tone of good light- and excellent wash-fastness, but does not protect against tendering.

*Example IV*

| | Parts |
|---|---|
| Pontachrome Brown MW—Color Index #101 | 4.0 |
| Triethanolamine | 10.0 |
| Cobalt chloride | 2.5 |
| Water | 18.5 |
| Thickening | 65.0 |
| Total | 100.0 |

The above described printing paste is printed on cotton, nylon or wool, dried, aged 45 minutes in a "cottage steamer," soaped, rinsed and dried. A red shade of brown is obtained in the imprinted areas. This design is faster to light and soaping than when the dyestuff is applied in the conventional acid medium.

*Example V*

| | Parts |
|---|---|
| Pontachrome Yellow GR—Color Index #109 | 3.0 |
| Triethanolamine | 5.0 |
| Sodium chromate | 2.5 |
| Water | 24.5 |
| Thickening | 65.0 |
| Total | 100.0 |

The above described printing paste is printed on cotton, wool or nylon, aged 30 minutes in a "cottage steamer," soaped, rinsed and dried. A reddish shade of yellow is obtained in the imprinted areas which is stronger, brighter and has greater penetration than when the dyestuff is applied in the conventional acid medium.

In a similar manner, other azo dyestuffs of the mordant-acid group may be applied to textile fabric with good results. The following is an additional list of typical metallizable dyestuffs to which this invention is applicable:

| | Color index |
|---|---|
| Pontachrome Black A | #204 |
| Pontachrome Brown G | #238 |
| Pontachrome Orange RL (described in German Pat. No. 134,162) | |
| Pontachrome Azure Blue B | #720 |
| Pontachrome Yellow 3RN | #40 |
| Eriochrome Bordeaux B | #168 |
| Chrome Fast Violet B | #169 |
| Pontachrome Blue SW | #180 |
| Pontachrome Blue Black BB | #201 |
| Pontachrome Red B | #216 |

It will be understood that my invention is susceptible of wide variation and modification in details within the skill of those engaged in this art.

I claim:

1. In the process of printing textile fabric with an unmetallized mordant-acid azo dyestuff, the improvement which consists of applying the dyestuff to the fabric from a printing paste containing a water-soluble compound of a metal whose atomic weight is not less than 52 and not greater than 64, and containing further a sufficient quantity of triethanolamine to give the paste an alkalinity corresponding to a pH value between 8.0 and 10.5.

2. A printing composition for textile fabric, comprising a thickening agent, water, an unmetallized mordant-acid azo dye, a water-soluble compound of a metal whose atomic weight is not less than 52 and not greater than 64, and a sufficient quantity of an ethanolamine to give the entire composition an alkaline reaction corresponding to a pH value between 8.0 and 10.5.

3. A printing composition for textile fabric, comprising a thickening agent, water, an unmetallized mordant-acid azo dye, a water-soluble compound of a metal whose atomic weight is not less than 52 and not greater than 64, and triethanolamine in quantity corresponding to between 5 and 15% by weight of the entire composition.

4. A printing paste for textile fabric, comprising beside the thickening agent, a metallizable azo dye from the group of mordant-acid dyes, a water-soluble salt of copper in quantity sufficient to react with the dyestuff on the fiber, and triethanolamine in quantity corresponding to from 5 to 15% by weight of the entire composition.

5. A printing paste for textile fabric, comprising beside the thickening agent, a metallizable azo dye from the group of mordant-acid dyes, a water-soluble salt of nickel in quantity sufficient to react with the dyestuff on the fiber, and triethanolamine in quantity corresponding to from 5 to 15% by weight of the entire composition.

6. A printing paste for textile fabric, comprising beside the thickening agent, a metallizable azo dye from the group of mordant-acid dyes, a water-soluble chromate in quantity sufficient to react with the dyestuff on the fiber, and triethanolamine in quantity corresponding to from 5 to 15% by weight of the entire composition.

CHARLES FRANKLIN MILLER.